United States Patent
Wood (10) Patent No.: US 7,624,432 B2
(45) Date of Patent: Nov. 24, 2009

(54) SECURITY AND AUTHORIZATION IN MANAGEMENT AGENTS

(75) Inventor: Douglas Andrew Wood, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 815 days.

(21) Appl. No.: 11/168,259

(22) Filed: Jun. 28, 2005

(65) Prior Publication Data
US 2006/0294103 A1 Dec. 28, 2006

(51) Int. Cl.
*G06F 21/00* (2006.01)
(52) U.S. Cl. .......................... 726/6; 713/163
(58) Field of Classification Search ........................ None
See application file for complete search history.

(56) References Cited

U.S. PATENT DOCUMENTS

| | | | |
|---|---|---|---|
| 5,276,901 A | 1/1994 | Howell et al. | |
| 5,315,657 A * | 5/1994 | Abadi et al. | 726/4 |
| 6,014,686 A * | 1/2000 | Elnozahy et al. | 709/202 |
| 6,189,036 B1 | 2/2001 | Kao | |
| 6,192,405 B1 * | 2/2001 | Bunnell | 709/225 |
| 6,216,231 B1 * | 4/2001 | Stubblebine | 726/10 |
| 6,233,576 B1 * | 5/2001 | Lewis | 707/9 |
| 6,263,434 B1 * | 7/2001 | Hanna et al. | 713/156 |
| 6,269,406 B1 | 7/2001 | Dutcher et al. | |
| 6,292,798 B1 | 9/2001 | Dockter et al. | |
| 6,453,353 B1 * | 9/2002 | Win et al. | 709/229 |
| 6,516,315 B1 | 2/2003 | Gupta | |
| 6,516,350 B1 * | 2/2003 | Lumelsky et al. | 709/226 |
| 6,785,728 B1 | 8/2004 | Schneider et al. | |
| 6,851,054 B2 * | 2/2005 | Wheeler et al. | 713/176 |
| 7,185,047 B1 * | 2/2007 | Bate et al. | 709/202 |
| 7,316,027 B2 * | 1/2008 | Burch et al. | 726/1 |
| 7,426,639 B2 * | 9/2008 | Ishiguro | 713/175 |
| 2001/0049787 A1 | 12/2001 | Morikawa et al. | |
| 2002/0178271 A1 * | 11/2002 | Graham et al. | 709/229 |
| 2003/0041198 A1 | 2/2003 | Exton et al. | |
| 2003/0237006 A1 * | 12/2003 | Himmel et al. | 713/202 |
| 2004/0003287 A1 * | 1/2004 | Zissimopoulos et al. | 713/201 |
| 2004/0205271 A1 | 10/2004 | O'Hare et al. | |
| 2005/0097353 A1 * | 5/2005 | Patrick et al. | 713/200 |
| 2005/0249350 A1 * | 11/2005 | Kahn et al. | 380/239 |
| 2006/0041903 A1 * | 2/2006 | Kahn et al. | 725/28 |
| 2007/0036516 A1 * | 2/2007 | Kahn et al. | 386/94 |

* cited by examiner

*Primary Examiner*—William R Korzuch
*Assistant Examiner*—Michael R Vaughan
(74) *Attorney, Agent, or Firm*—Rabindranath Dutta; Konrad Raynes and Victor LLP (57) ABSTRACT

Provided are a method, a system, an article of manufacture, and a computer program product, wherein a first indicator is stored for a first entity, and wherein the first indicator identifies groups to which the first entity belongs and operations associated with the groups. The first entity receives a second indicator from a second entity, wherein the second indicator indicates privileges granted to the second entity for at least one operation on at least one group. A determination is made locally by the first entity, whether an operation requested by the second entity is to be executed by the first entity, based on a comparison of the second indicator to the first indicator.

20 Claims, 6 Drawing Sheets

SECURITY AND AUTHORIZATION IN MANAGEMENT AGENTS

BACKGROUND

1. Field

The disclosure relates to a method, system, and article of manufacture for providing security and authorization in management agents.

2. Background

In a management environment, centralized management applications may use agents installed on managed systems to remotely perform operations on the managed systems. A single operation by a management application may simultaneously target many hundreds or thousands of agents each of which support an operation with identical semantics. The existence of a plurality of agents with the capability to perform similar operations allows a single operation invocation by a management application to be duplicated and sent to the plurality of agents. However, a selected management application on a management server many not have the same rights to perform operations on each agent.

In certain management environments, each agent may be run in the local security domain of the environment managed by the agent. Each invocation by a management application of operations on a target agent may need credentials that are specific to the security domain of the target agent. Such schemes may cause difficulties in heterogeneous management environments in which agents exist in many security domains. However, such schemes may be usable in management environments in which all target agents can be expected to share a local security domain, such as the Microsoft Windows* domain.

* Microsoft Windows is a trademark or registered trademark of Microsoft Corporation. Kerberos is a trademark of Massachusetts Institute of Technology.

In certain management environments, agents may establish trusted relationships with a management server. Once a trust relationship has been established the management server is granted complete access to the operation exposed by an agent. This model may be implemented when there is a close coupling between agent functions and management servers and may be used in certain heterogeneous management environments. However, this model causes a proliferation of agents on managed systems because each management server installs a trusted agent on the systems managed by the management server. The model may cause difficulties for an agent that hosts management functions for an arbitrary set of management servers.

SUMMARY OF THE DESCRIBED EMBODIMENTS

Provided are a method, a system, an article of manufacture, and a computer program product, wherein a first indicator is stored for a first entity, and wherein the first indicator identifies groups to which the first entity belongs and operations associated with the groups. The first entity receives a second indicator from a second entity, wherein the second indicator indicates privileges granted to the second entity for at least one operation on at least one group. A determination is made locally by the first entity, whether an operation requested by the second entity is to be executed by the first entity, based on a comparison of the second indicator to the first indicator.

In certain additional embodiments, the first entity is an agent having sub-agents, wherein the second entity is a management application, wherein the first indicator is a group assignment, wherein the second indicator is an access control ticket, and wherein there are more agents than management applications.

In further additional embodiments, the first entity receives a cryptographically certified identity of the second entity. The first entity authenticates the second entity from the cryptographically certified identity of the second entity. The operation requested by the second entity is executed, in response to the second entity being successfully authenticated and in response to determining that the operation requested by the second entity is to be executed by the first entity.

In still further embodiments, the second indicator is a group assignment that is received by the first entity via a group assignment ticket generated by a central access control server, wherein the group assignment ticket lists all group identifiers for the groups of which the first entity is a member, and wherein the group assignment ticket is cryptographically signed by a trusted certificate server.

In yet further embodiments, an unique identifier represents a group name for a group, and wherein the second entity can change the unique identifier that represents the group name. The second entity requests a central access control database server for the second indicator. The second entity receives the second indicator from the central access control server, wherein the second indicator has been cryptographically signed by a trusted certificate server.

In still further embodiments, a plurality of first entities all determine locally at computational platforms including the plurality of first entities whether operations requested by second entities can be executed, and wherein a central server is not accessed by the plurality of first entities to determine whether the operations requested by the second entities can be executed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
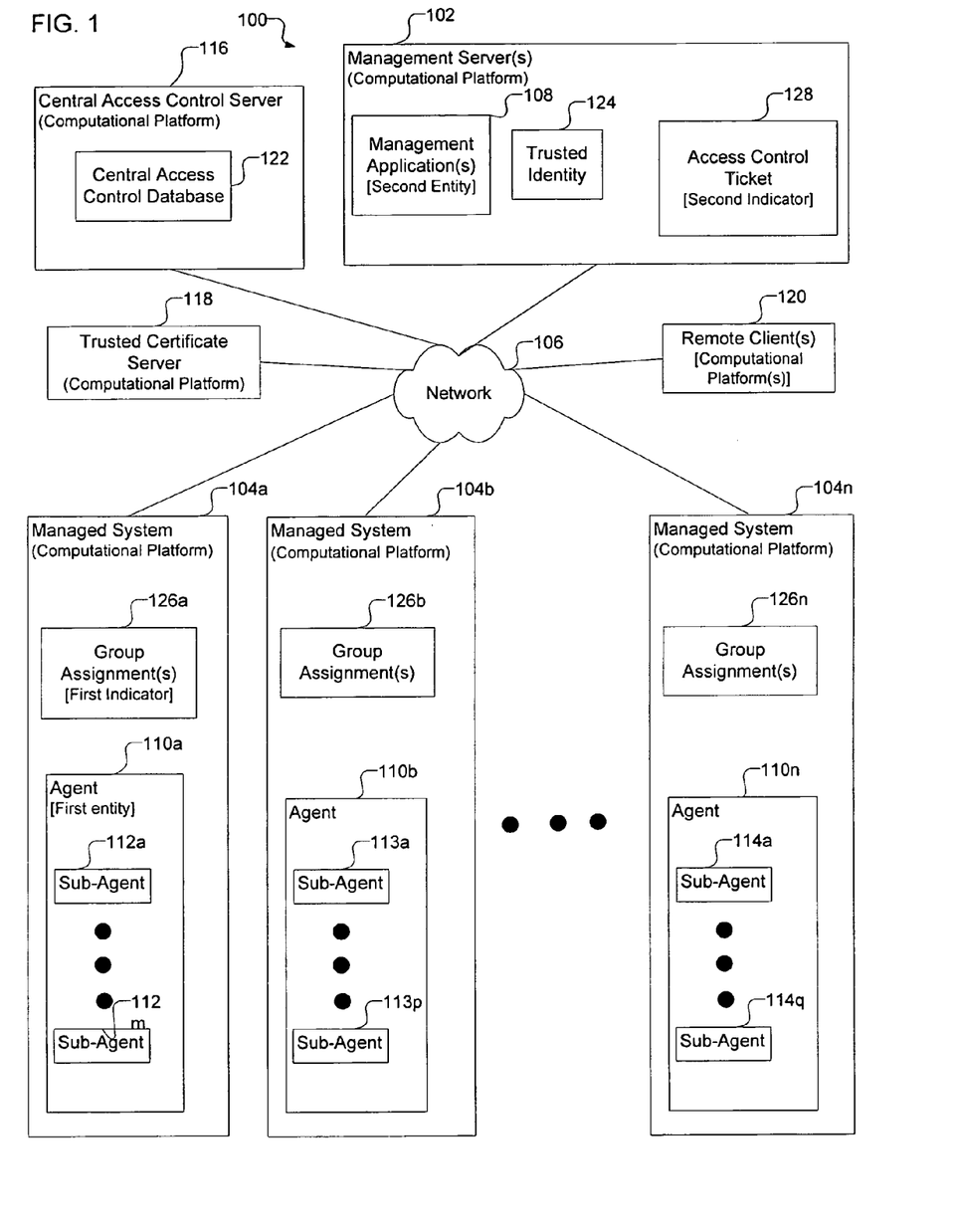
FIG. 1 illustrates a block diagram of a computing environment in accordance with certain embodiments.

FIG. 1 illustrates a block diagram of a computing environment 100 in accordance with certain embodiments.

At least one management server 102 is coupled to a plurality of managed systems 104a, 104b, . . . , 104n over a network 106. In certain embodiments, the management server 102 includes one or more management applications 108 and the managed systems 104a, 104b, . . . , 104n include agents 110a, 110b, . . . , 110n respectively. For example, the managed system 104a may include the agent 110a, the managed system 104b may include the agent 110b, and the managed system 104n may include the agent 110n. Each agent may include a plurality of sub-agents. For example, agent 110a may include a plurality of sub-agents 112a . . . 112m, agent 110b may include a plurality of sub-agents 113a . . . 113p, and agent 110n may include a plurality of sub-agents 114a . . . 114q.

In certain embodiments, the agents 110a . . . 110n may expose management operations as Web services to the management applications 108. In alternative embodiments, the agents 110a . . . 110n may expose management operations via other protocols that are different from Web services. The management server 102 may invoke any operation on any agent, such as, agent 110a. For an agent, such as, agent 110a, to successfully host management functions from a plurality of management applications 108, an access control solution for the agent may allow the agent 110a to make access decisions based on the identity of the agent, the identity of the operation being invoked, and the identity of the invoker.

A central access control server 116, a trusted certificate server 118, and remote clients 120 may also be coupled to the network 106. The central access control server 116 includes a central access control database 122 that may store information on how a plurality of agents are grouped into a plurality of groups, where operations may be attempted on the plurality of groups by the management applications 108.

The trusted certificate server 118 may act as a certificate authority that is trusted by the managed systems 104a . . . 104n and the management server 102. For example, the trusted certificate server 118 may provide a trusted identity 124 that is cryptographically signed by the trusted certificate server 118, where the trusted identity 124 corresponds to the identity of the management server 102. Since the managed systems 104a . . . 104n trust the trusted certificate server 118m to sign certificates, the managed systems 104a . . . 104n may authenticate the management server 102 by examining the trusted identity 124 of the management server 102. Alternative embodiments may use other mechanisms for cryptographically proving a systems identity, such as, Kerberos.

In certain embodiments, the remote clients 120 may use the management applications 108 to attempt to perform operations on the agents 110a . . . 110n. In certain embodiments the operations performed by the remote clients 120 may be performed by the management applications 108.

The information on the grouping of agents into groups are stored in data structures referred to as group assignments 126a, 126b, . . . , 126n. The group assignments 126a . . . 126n may be distributed to the managed systems 104a . . . 104n by the central access control database 122.

In certain embodiments, the management server 102, the managed systems 104a . . . 104n, the central access control server 116, the trusted certificate server 118, and the remote clients 120 may comprise any suitable computational platforms, including those presently known in the art, such as, personal computers, workstations, mainframes, midrange computers, network appliances, palm top computers, telephony devices, blade computers, hand held computers, etc. The network 106 may comprise any network known in the art, such as a Storage Area Network (SAN), Local Area Network (LAN), Wide Area Network (WAN), the Internet, an Intranet, etc.

In certain embodiments the management applications 108, the agents 110a . . . 110n, and the sub-agents 112a . . . 112n, 113a . . . 113p, 114a . . . 114q may comprise applications embodied in software, hardware, firmware, or any combination thereof. In certain embodiments, a greater or a fewer number of components than those illustrated in FIG. 1 may be used to perform operations performed by the components shown in FIG. 1.

Certain embodiments allow the agents 110a . . . 110n to use group assignments 126a . . . 126n, and an access control ticket 128 provided by the management application 108 to determine whether to allow an operation requested by the management application 108 to be executed by an agent, such as, any of the agents 110a . . . 110n. The access control ticket 128 may indicate the extent of privileges granted to the management application 102 by the central access control server 116, for operations to be performed with respect to one or more groups into which the agents 110a . . . 110n are grouped.

Figure 2:
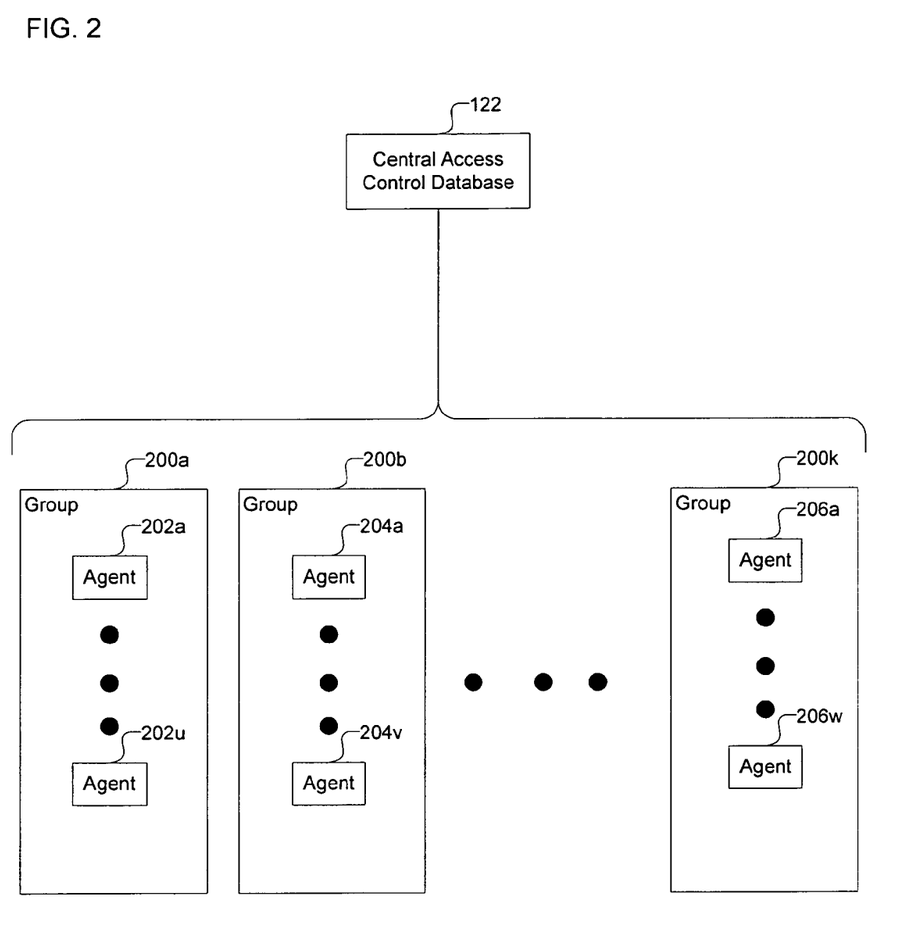
FIG. 2 illustrates a block diagram that shows how agents are assigned to groups, in accordance with certain embodiments.

FIG. 2 illustrates a block diagram that shows how agents are assigned to groups, in accordance with certain embodiments implemented in the computing environment 100.

The central access control database 122 may store information on the groupings of agents in the computing environment 100. For example, FIG. 2 shows exemplary groups 200a, 200b, . . . 200k, where group 200a includes agents 202a . . . 202u, group 200b includes agents 204a . . . 204v, and group 200k includes agents 206a . . . 206w. In certain embodiments, the same agent may be included in a plurality of groups. For example, the agent 110a shown in FIG. 1 may be included in both group 202a and group 202b.

In certain embodiments, there may be far too many agents for it to be practical for an individual access control ticket to be issued for every agent on which a management server 102 wishes to invoke an operation. It may also require significant memory and processor time to individually list every agent that is the target of an operation in a single access control ticket. Certain embodiments provide one or more grouping mechanisms that are resolvable by the agent without reference to a central server. The management applications 108 on the management server 102 may invoke operations on agents by presenting to the agents the access control ticket 128 (shown in FIG. 1) that indicates the extent of privileges granted to the management application 108 by the central access control server 116, for operations to be performed with respect to one or more groups 200a . . . 200k into which the agents are grouped.

Figure 3:
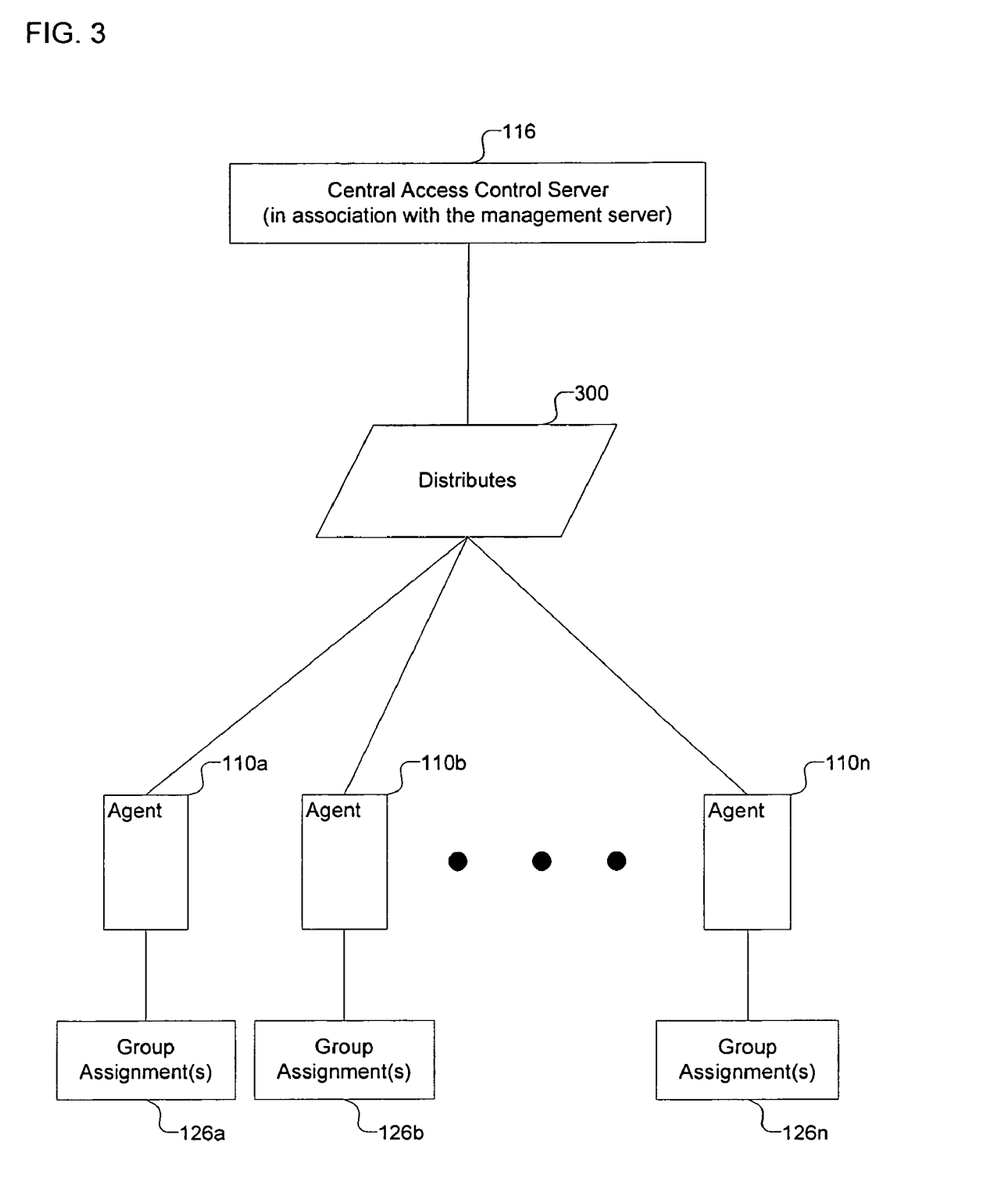
FIG. 3 illustrates a block diagram that illustrates how group assignments for agents are distributed, in accordance with certain embodiments.

FIG. 3 illustrates a block diagram that illustrates how group assignments 126a, 126b, . . . , 126n for the agents 110a, 110b, . . . , 110n are distributed, in accordance with certain embodiments implemented in the computing environment 100.

In certain embodiments, the central access control server 116 may distribute 300 the group assignments 126a, 126b, . . . , 126n to the agents 110a, 110b, . . . , 110n respectively.

The central access control sever 116 may explicitly assign the membership of agents to groups and then communicate the group membership to the agents 110a . . . 110n by a signed membership list referred to as the group assignments 126a . . . 126n. The group assignments 126a . . . 126n may include a list of list of zero or more groups to which the agent is assigned membership, where group names may be unique identifiers. An expiration date may also be indicated for the groups.

The group assignments 126a ... 126n may be signed by the trusted certificate server 118. New group assignments may either be designed to replace an existing set of group assignments, and group assignments may be extended.

In certain embodiments, the group assignments 126a ... 126n may be used for agents that are well known and have relatively stable group membership, and for agents for which deterministic control of access is required, such as, those for machines in a data center.

Therefore, FIG. 3 illustrates certain embodiments in which a central access control server 116 sends group assignments 126a ... 126n corresponding to agents 110a ... 110n in managed systems 104a ... 104n.

Figure 4:
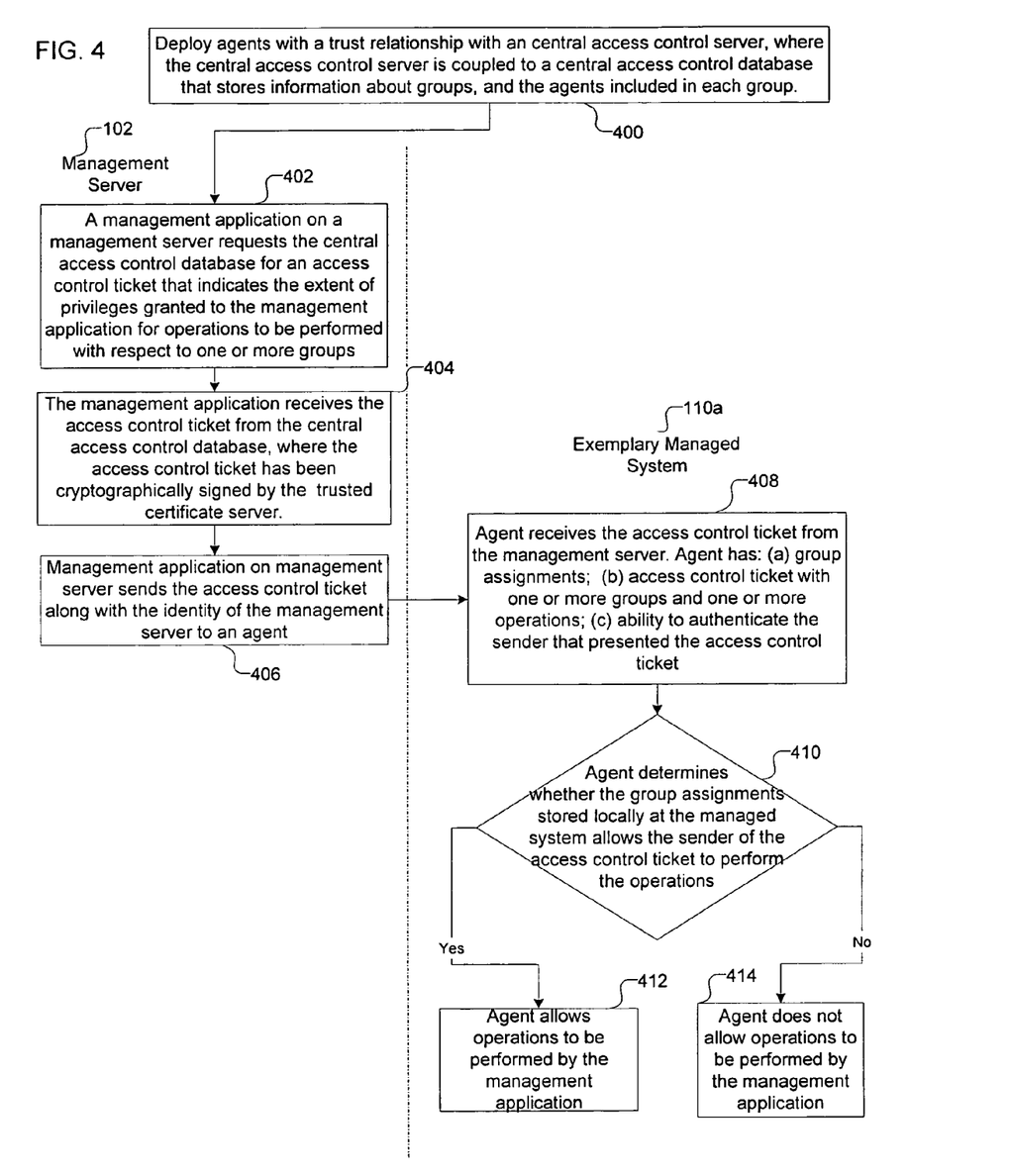
FIG. 4 illustrates a first flowchart that illustrates whether an agent allows an operation requested by a management application to be performed, in accordance with certain embodiments.

FIG. 4 illustrates a first flowchart that illustrates whether an agent, such as, agent 110a, allows an operation requested by a management application 108 to be performed, in accordance with certain embodiments implemented in the computing environment 100.

Control starts at block 400, where the central access control server 116 deploys agents 110a ... 110n with a trust relationship with the central access control server 116, where the central access control server 116 is coupled to a central access control database 122 that stores information about groups, and the agents included in each group.

A management application 108 on a management server 102 requests (at block 402) the central access control database 122 for an access control ticket 128 that indicates the extent of privileges granted to the management application 108 for operations to be performed with respect to one or more groups.

The management application 108 receives (at block 404) the access control ticket 128 from the central access control database 122, where the access control ticket 128 has been cryptographically signed by the trusted certificate server 118.

The management application 108 on the management server 102 sends (at block 406) the access control ticket 128 along with the trusted identity 124 of the management server 102 to an agent, such as, agent 110a. In certain embodiments, the access control ticket 128 may be sent to one or more agents and may include agents different from agent 110a.

The agent 110a receives (at block 408) the access control ticket 128 from the management server 102. The agent 110a has access to the locally stored group assignments 126a, the access control ticket 128 with one or more groups and one or more operations. Additionally, the agent 110a possesses the ability to authenticate the sender that presented the access control ticket 128.

The agent 110a determines (at block 410) whether the group assignments 126a stored locally at the managed system 104a allow the sender of the access control ticket 128 to perform operations that may have been included or sent separately from the access control ticket 128. If so, the agent 110a allows (at block 412) operations to be performed by the management application 108 on the agent 110a. If not, the agent 110a does not allow (at block 414) operations to be performed by the management application 108 on the agent 110a. The determination of whether to allow operations by the management application 108 is made locally at the agent 110a.

In certain embodiments, in which there are tens, hundreds, thousands or more agents 110a ... 110n, by determining locally at the agents 110a ... 110n whether operations by management applications 108 may be performed by the agents 110a ... 110n, a single point of failure that may have been caused if the determination was not made locally is avoided.

Certain embodiments avoid introducing a single point of failure and avoids overloading communications within the computing environment 100 by determining locally at the agents 110a ... 110n whether operations by management applications 108 may be performed by the agents 110a ... 110n.

Figure 5:
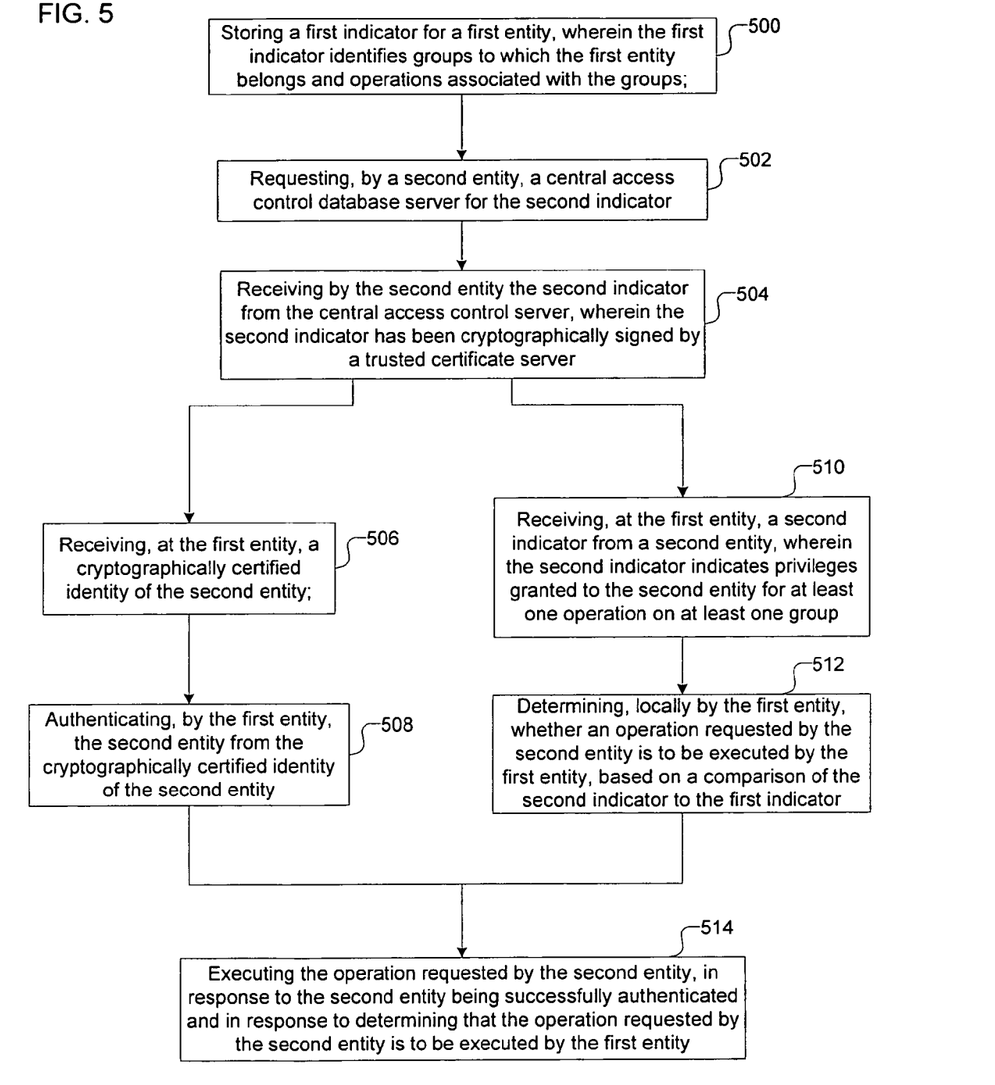
FIG. 5 illustrates a second flowchart that illustrates whether a first entity allows an operation requested by a second entity to be performed, in accordance with certain embodiments.

FIG. 5 illustrates a second flowchart that illustrates whether a first entity allows an operation requested by a second entity to be performed in the computing environment 100, in accordance with certain embodiments. In certain embodiments, the first entity is an exemplary agent, such as, the agent 110a, and a second entity is a management application 108.

Control starts at block 500, by storing a first indicator for a first entity, wherein the first indicator identifies groups to which the first entity belongs and operations associated with the groups. For example, in certain embodiments the first entity is an agent 110a having sub-agents 112a ... 112m, a second entity is the management application 108, the first indicator is a group assignment 126a, and a second indicator is an access control ticket 128.

The second entity requests (at block 502), a central access control database server 116, for the second indicator 128. The second entity 108 receives (at block 504) the second indicator 128 from the central access control server 116, wherein the second indicator 128 has been cryptographically signed by a trusted certificate server 118.

The first entity 110a receives (at block 506) a cryptographically certified identity of the second entity 108. The first entity 110a authenticates (at block 508) the second entity 108 from the cryptographically certified identity of the second entity 108.

In parallel with the execution of blocks 506 and 508, the first entity 110a receives (at block 510) the second indicator 128 from the second entity 108, wherein the second indicator 128 indicates privileges granted to the second entity 108 for at least one operation on at least one group. In certain embodiments, in which the second indicator is a group assignment, the group assignment can be distributed to the agent in advance of the management system initiating an operation. For example, the group assignment can be distributed as soon as the group assignment is made and need not be updated unless the group assignment is changed. Additionally, the same group assignment can be used for many operation invocations by many management servers. The first entity 110a determines (at block 512) locally whether an operation requested by the second entity 108 is to be executed by the first entity 110a, based on a comparison of the second indicator 128 to the first indicator 126a, where in certain embodiments the first entity 110a is an agent.

At the conclusion of blocks 508 and 512, the operation requested by the second entity 108 is executed (in block 514), in response to the second entity 108 being successfully authenticated and in response to determining that the operation requested by the second entity 108 is to be executed by the first entity 110a. The local determination as to whether an operation requested by the second entity 108 is to be executed by the first entity 110a, based on a comparison of the second indicator 128 to the first indicator 126a avoids the use of a central database to check whether operations sent by the second entity 108 are to be executed by the first entity 110a.

In certain embodiments, the first entity is an agent having sub-agents, wherein the second entity is a management application, wherein the first indicator is a group assignment, wherein the second indicator is an access control ticket, and wherein there are more agents than management applications. In certain exemplary embodiments, a small number of entities, such as, a set of finance applications, may access a larger number of entities, such as, a network of Automated Teller Machines (ATM).

In certain embodiments, the second indicator is a group assignment that is received by the first entity via a group assignment ticket generated by a central access control server, wherein the group assignment ticket lists all group identifiers for the groups of which the first entity is a member and wherein the group assignment ticket is cryptographically signed by a trusted certificate server. In certain embodiments, group assignments may be separated into any number of indicators up to one indicator for every group an agent belongs to.

In certain embodiments, access control information is included in the operation invocation. As a result, group assignments may need to be updated only in response to an agent being added or removed from a group, not when an access control list changes.

Certain embodiments may also provide a mechanism for using unique identifiers to represent group names. In such embodiments, the identifier (ID) used to describe a group to an agent is created by the central access control database 122 or a management server and may be arbitrary. The central access control database 122 can effectively delete a group ID by ceasing to issue access control tickets for that ID. For example, if a group called A has exemplary agents x, y, and z as members, than the central access control database 122 assigns the group called A the ID of 1 and distributes to exemplary agents x, y, and z a ticket indicating that each of them belongs to group 1.

When an exemplary management server M wants to invoke an operation O on group A, the exemplary management server M requests a ticket from the central access control database 122. Assuming that the exemplary management server M has rights to invoke the operation on the group A, the central access control database 122 issues a ticket indicating that the exemplary management server M can invoke operation O on group 1.

If an exemplary agent w is later added to group A, then agent w is issued an assignment to group 1. Additionally if at a later time, agent z is removed from group A, the central access control database assigns group A to a new ID of 2 and distributes to agents w, x, and y a ticket indicating that agents w, x, and y belong to group 2.

When the management server M wants to invoke an operation O on group A, the management server M requests a ticket from the central access control database 122. The central access control database issues the management server M a ticket indicating that the management server M can invoke operation O on group 2. In exemplary embodiments, the ID 1 is not reused and no further tickets granting access to 1 are issued. The assignments to group 1 expire after a certain period of time and can be removed from the central access control database 122.

It may not always be suitable to require the invocation of every operation on every agent to validate rights against a central database. Additionally, it may not always be suitable for a single operation invocation to carry authentication credentials for each target agent. Additionally, it may not also be suitable for an operation invocation to include authorization information for each target agent.

Certain embodiments provide a mechanism for providing security group membership information to security entities that have delegated authority to make access control decisions. Local decisions made by the delegated entities use information about group membership, while certain embodiments allow both actual group membership and the rights associated with a group to be centrally administered. A delegated entity may need to be only informed of the group membership of the delegated entity at the time the delegated entity is added to a group.

Operations invoked by the management server may include a single concise description of the rights granted to the management server that can be duplicated and used in the invocation of the operation on every target agent. An agent uses a combination of the group membership assigned some time in advance of the operations, and the rights statement included with the operation invocation to determine whether the operations should be allowed.

A rights calculation utilizes a cryptographically validated identity of the operation invoker. Additionally, the rights calculation may also use an access rights statement that is cryptographically signed by an identity that is trusted by the agent to grant rights and is included with the operation invocation. Furthermore, an assignment of the agent to one or more security groups is cryptographically signed by an identity that is trusted by the agent to make groups assignments, and the assignment is distributed in advance of the operation invocation.

Certain embodiments, avoid operations on hundreds of thousands of agents and sub-agents. The performance penalty that may be caused by a centralized database is avoided and a single point of failure is also avoided.

Certain embodiments provide an access enforcement engine that is small enough to be included with the agent. Certain embodiments also provide an interface with access control databases and provide a mechanism to distribute access control information to agents. Certain embodiments allow diverse rights to be applied to a large number of similarly intelligent resources, such as, as system management agents.

In certain embodiments, the group assignment ticket does not have to contain all the groups an entity belongs to. Each time an entity is added to a group the entity can be issued a ticket that indicates membership in that group. Thus a group membership ticket can indicate membership in one or more groups and a single entity may be issued any number of group membership tickets. The set of groups to which the entity belongs may be the union of all membership tickets.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal may comprise a tangible medium in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
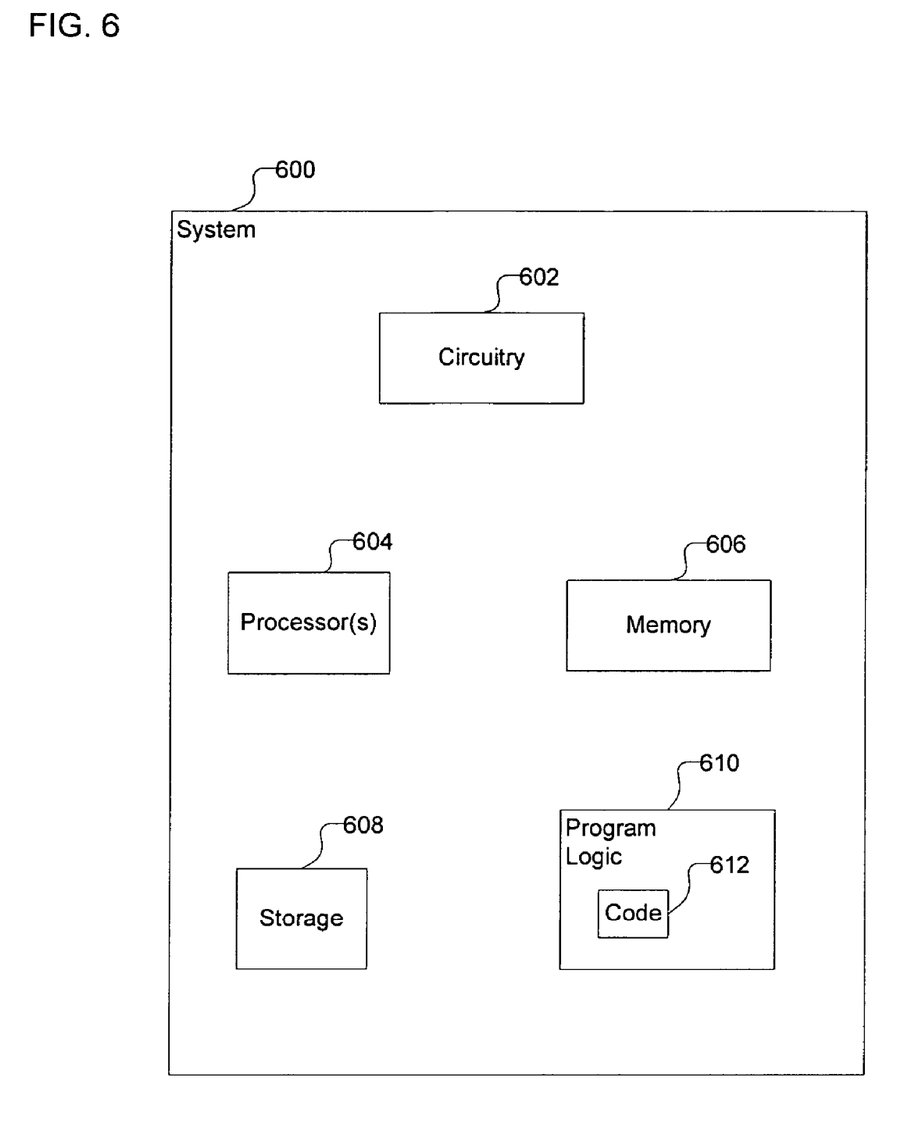
FIG. 6 illustrates a system in which certain embodiments are implemented, in accordance with certain embodiments.

FIG. 6 illustrates a block diagram of a system 600 in which certain embodiments may be implemented. In certain embodiments, the computational platforms shown in FIG. 1 such as the management server 102, and the managed systems 104a . . . 104n may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the computational platforms 102, 104a . . . 104n. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 4 and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of

What is claimed is:

1. A computer-implemented method, comprising:

maintaining, in each managed system of a plurality of managed systems that are coupled to a management server via a network, at least one agent having a plurality of sub-agents, wherein a single operation by a management application executing in the management server targets a plurality of agents executing in the plurality of managed systems, wherein each of the plurality of agents supports at least one operation with identical semantics, and wherein the plurality of agents with capabilities to perform similar operations allow a single operation invocation by the management application to be duplicated and sent to the plurality of agents;

storing, in a first computational platform that is a first managed system, a group assignment for an agent, wherein the group assignment identifies one or more groups to which the agent belongs and operations associated with the one or more groups;

receiving, at the agent in the first computational platform, an access control ticket from the management application that executes in a second computational platform that is the management server, wherein the access control ticket indicates privileges granted to the management application by a central access control server for operations to be performed with respect to a plurality of groups, and wherein the management application avoids issuing an individual access control ticket for every agent of the plurality of agents on which the management application invokes an operation; and determining, locally in the first computational platform by the agent without referencing the central access control server, whether an operation requested by the management application is to be executed by the agent, based on a comparison of the access control ticket received from the management application to the group assignment for the agent, wherein an unique identifier represents a group name for a group, and wherein the management application can change the unique identifier that represents the group name, the method further comprising:

requesting, by the management application, the central access control server for the access control ticket; and receiving by the management application the access control ticket from the central access control server, wherein the access control ticket has been cryptographically signed by a trusted certificate server, wherein the method further comprises receiving, at the agent, a cryptographically certified identity of the management application, authenticating, by the agent, the management application from the cryptographically certified identity of the management application, and executing the operation requested by the management application, in response to the management application being successfully authenticated and in response to determining that the operation requested by the management application is to be executed by the agent.

2. The method of claim 1, wherein the agent has sub-agents and wherein there are more agents than management applications.

3. The method of claim 1, wherein the access control ticket is cryptographically signed by a trusted certificate server.

4. The method of claim 1, wherein a plurality of agents all determine locally whether operations requested by management applications can be executed, and wherein a central server is not accessed by the plurality of agents to determine whether the operations requested by the management applications can be executed.

5. The method of claim 1, wherein the plurality of agents expose management operations as Web services to the management application.

6. A system, comprising:

memory; and processor coupled to the memory, wherein the system is operable to:

maintain, in each managed system of a plurality of managed systems that are coupled to a management server via a network, at least one agent having a plurality of sub-agents, wherein a single operation by a management application executing in the management server targets a plurality of agents executing in the plurality of managed systems, wherein each of the plurality of agents supports at least one operation with identical semantics, and wherein the plurality of agents with capabilities to perform similar operations allow a single operation invocation by the management application to be duplicated and sent to the plurality of agents;

store, in a first computational platform that is a first managed system, a group assignment for an agent, wherein the group assignment identifies one or more groups to which the agent belongs and operations associated with the one or more groups;

receive, at the agent in the first computational platform, an access control ticket from the management application that executes in a second computational platform that is the management server, wherein the access control ticket indicates privileges granted to the management application by a central access control server for operations to be performed with respect to a plurality of groups, and wherein the management application avoids issuing an individual access control ticket for every agent of the plurality of agents on which the management application invokes an operation; and determine, locally in the first computational platform by the agent without referencing the central access control server, whether an operation requested by the management application is to be executed by the agent, based on a comparison of the access control ticket received from the management application to the group assignment for the agent, wherein an unique identifier represents a group name for a group, and wherein the management application can change the unique identifier that represents the group name, wherein the system is further operable to:

request, by the management application, the central access control sewer for the access control ticket; and receive by the management application the access control ticket from the central access control server, wherein the access control ticket has been cryptographically signed by a trusted certificate server, wherein the system is further operable to receive, at the agent, a cryptographically certified identity of the management application, authenticate, by the agent, the management application from the cryptographically certified identity of the management application, and execute the operation requested by the management application, in response to the management application being successfully authenticated and in response to determining that the operation requested by the management application is to be executed by the agent.

7. The system of claim 6, wherein the agent has sub-agents, and wherein there are more agents than management applications.

8. The system of claim 6, wherein the access control ticket is cryptographically signed by a trusted certificate server.

9. The system of claim 6, wherein a plurality of agents all determine locally whether operations requested by management applications can be executed, and wherein a central server is not accessed by the plurality of agents to determine whether the operations requested by the management application can be executed.

10. The system of claim 6, wherein the plurality of agents expose management operations as Web services to the management application.

11. An article of manufacture, wherein the article of manufacture is capable of causing operations on a system, the operations on the system comprising:

maintaining, in each managed system of a plurality of managed systems that are coupled to a management server via a network, at least one agent having a plurality of sub-agents, wherein a single operation by a management application executing in the management sewer targets a plurality of agents executing in the plurality of managed systems, wherein each of the plurality of agents supports at least one operation with identical semantics, and wherein the plurality of agents with capabilities to perform similar operations allow a single operation invocation by the management application to be duplicated and sent to the plurality of agents;

storing, in a first computational platform that is a first managed system, a group assignment for an agent, wherein the group assignment identifies one or more groups to which the agent belongs and operations associated with the one or more groups;

receiving, at the agent in the first computational platform, an access control ticket from the management application that executes in a second computational platform that is the management server, wherein the access control ticket indicates privileges granted to the management application by a central access control server for operations to be performed with respect to a plurality of groups, and wherein the management application avoids issuing an individual access control ticket for every agent of the plurality of agents on which the management application invokes an operation; and determining, locally in the first computational platform by the agent without referencing the central access control server, whether an operation requested by the management application is to be executed by the agent, based on a comparison of the access control ticket received from the management application to the group assignment for the agent, wherein an unique identifier represents a group name for a group, and wherein the management application can change the unique identifier that represents the group name, the operations on the system further comprising:

requesting, by the management application, the central access control server for the access control ticket; and receiving by the management application the access control ticket from the central access control server, wherein the access control ticket has been cryptographically signed by a trusted certificate server, wherein the operations on the system further comprise receiving, at the agent, a cryptographically certified identity of the management application, authenticating, by the agent, the management application from the cryptographically certified identity of the management application, and executing the operation requested by the management application, in response to the management application being successfully authenticated and in response to determining that the operation requested by the management application is to be executed by the agent.

12. The article of manufacture of claim 11, wherein the agent has sub-agents, and wherein there are more agents than management applications.

13. The article of manufacture of claim 11, wherein the access control ticket is cryptographically signed by a trusted certificate server.

14. The article of manufacture of claim 11, wherein a plurality of agents all determine locally whether operations requested by management applications can be executed, and wherein a central server is not accessed by the plurality of agents to determine whether the operations requested by the management application can be executed.

15. The article of manufacture of claim 11, wherein the plurality of agents expose management operations as Web services to the management application.

16. A method for deploying computing infrastructure, comprising integrating computer readable code into a computing system, wherein the computer readable code in combination with the computing system is capable of performing:

maintaining, in each managed system of a plurality of managed systems that are coupled to a management server via a network, at least one agent having a plurality of sub-agents, wherein a single operation by a management application executing in the management server targets a plurality of agents executing in the plurality of managed systems, wherein each of the plurality of agents supports at least one operation with identical semantics, and wherein the plurality of agents with capabilities to perform similar operations allow a single operation invocation by the management application to be duplicated and sent to the plurality of agents;

storing, in a first computational platform that is a first managed system, a group assignment for an agent, wherein the group assignment identifies one or more groups to which the agent belongs and operations associated with the one or more groups;

receiving, at the agent in the first computational platform, an access control ticket from the management application that executes in a second computational platform that is the management server, wherein the access control ticket indicates privileges granted to the management application by a central access control server for operations to be performed with respect to a plurality of groups, and wherein the management application avoids issuing an individual access control ticket for every agent of the plurality of agents on which the management application invokes an operation; and determining, locally in the first computational platform by the agent without referencing the central access control server, whether an operation requested by the management application is to be executed by the agent, based on a comparison of the access control ticket received from the management application to the group assignment for the agent, wherein an unique identifier represents a group name for a group, and wherein the management application can change the unique identifier that represents the group name, wherein the computer readable code in combination with the computing system is further capable of performing:

requesting, by the management application, the central access control server for the access control ticket; and receiving by the management application the access control ticket from the central access control server, wherein the access control ticket has been cryptographically signed by a trusted certificate server, wherein the computer readable code in combination with the computing system is further capable of performing: receiving, at the agent, a cryptographically certified identity of the management application, authenticating, by the agent, the management application from the cryptographically certified identity of the management application, and executing the operation requested by the management application, in response to the management application being successfully authenticated and in response to determining that the operation requested by the management application is to be executed by the agent.

17. The method of claim 16, wherein the agent has sub-agents, and wherein there are more agents than management applications.

18. The method of claim 16, wherein the access control ticket is cryptographically signed by a trusted certificate server.

19. The method of claim 16, wherein a plurality of agents all determine locally whether operations requested by management applications can be executed, and wherein a central server is not accessed by the plurality of agents to determine whether the operations requested by the management application can be executed.

20. The method for deploying computing infrastructure of claim 16, wherein the plurality of agents expose management operations as Web services to the management application.

* * * * *